United States Patent
Imaeda (10) Patent No.: US 7,502,628 B2
(45) Date of Patent: Mar. 10, 2009

(54) MANAGEMENT METHOD FOR SERVICE FOR STORING DATA FROM MEMORY CARD IN EXTERNAL STORAGE DEVICE AND SYSTEM FOR CARRYING OUT THE SERVICE

(75) Inventor: Eiji Imaeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1112 days.

(21) Appl. No.: 10/411,566

(22) Filed: Apr. 10, 2003

(65) Prior Publication Data

US 2004/0204093 A1 Oct. 14, 2004

(30) Foreign Application Priority Data

Apr. 26, 2002 (JP) .............................. 2002-127080

(51) Int. Cl.
H04B 1/38 (2006.01)
(52) U.S. Cl. ........................................ 455/558; 348/46
(58) Field of Classification Search .................. 455/558
See application file for complete search history.

(56) References Cited

U.S. PATENT DOCUMENTS

| | | | |
|---|---|---|---|
| 6,353,848 B1 * | 3/2002 | Morris | 709/203 |
| 6,405,278 B1 * | 6/2002 | Liepe | 711/103 |
| 6,509,910 B1 * | 1/2003 | Agarwal et al. | 715/752 |
| 6,574,716 B2 * | 6/2003 | Dovi | 711/147 |
| 6,615,381 B1 | 9/2003 | Fukuda et al. | |
| 6,950,800 B1 * | 9/2005 | McIntyre et al. | 705/1 |
| 7,028,075 B2 * | 4/2006 | Morris | 709/206 |
| 7,181,129 B2 * | 2/2007 | Saito | 386/94 |
| 7,355,759 B1 * | 4/2008 | Kokusho | 358/440 |
| 2002/0032618 A1 * | 3/2002 | Nakamura et al. | 705/26 |
| 2002/0037745 A1 | 3/2002 | Yahiro | |
| 2002/0097259 A1 * | 7/2002 | Marshall et al. | 345/738 |
| 2003/0074529 A1 * | 4/2003 | Crohas | 711/115 |

FOREIGN PATENT DOCUMENTS

| | | |
|---|---|---|
| CN | 1302404 A | 7/2001 |
| JP | 10-304293 | 11/1998 |
| JP | 11 308588 | 5/1999 |
| JP | 11-308588 | 11/1999 |
| JP | 11-355854 | 12/1999 |
| JP | 2001-61125 A | 3/2001 |

(Continued)

OTHER PUBLICATIONS

Office Action from Japanese Patent Office, dated Sep. 15, 2006, concerning counterpart Japanese Patent Application No. 2002-127080.

(Continued)

*Primary Examiner*—Simon Sing
(74) *Attorney, Agent, or Firm*—Morgan & Finnegan, LLP (57) ABSTRACT

A memory card is provided with a memory interface and a wireless communication unit, which makes a connection with a data storage device provided in a remote place through a wireless line, and transfers data to the data storage device. A memory space of a database server in a remote place looks as if it exists in the memory card. In addition, a capacity of the database server can be set arbitrarily from a cellular phone.

16 Claims, 7 Drawing Sheets

FOREIGN PATENT DOCUMENTS

| | | |
|---|---|---|
| JP | 2001-344215 A | 12/2001 |
| JP | 2002-99475 | 4/2002 |
| WO | WO 01-58138 | 8/2001 |
| WO | WO 01/58138 A1 | 8/2001 |
| WO | WO 01-59622 | 8/2001 |
| WO | WO 01/59622 A2 | 8/2001 |

OTHER PUBLICATIONS

European Patent Office; "European Search Report" of European Patent Application No. 03 25 2249; dated Feb. 27, 2006 (3 pages).

Korean Patent Office; "Official Letter/Search Report"; corresponding to KR Patent Application No. KR 10-2003-0026306; dated Jan. 19, 2005 (2 pages).

Patent Office of the People's Republic of China; "Chinese Search Report"; corresponding to CN Patent Application No. CN 031232930; dated Oct. 15, 2004; (11 pages).

Communication Cited in Corresponding Foreign Counterpart Application: Communication from the European Patent Office Concerning Application 03 252 249.2 dated Nov. 26, 2007.

English Translation Abstract of Japanese Patent Publication JP 11 308588.

* cited by examiner

INPUT ID

→ [         ]

OK

CANCEL

FIG. 5B

SELECT CAPACITY

| 15MB  | 300 YEN  |
| 30MB  | 500 YEN  |
| 60MB  | 800 YEN  |
| 120MB | 1000 YEN |
| 240MB | 1500 YEN |

FIG. 5C

CONFIRM DETAIL

CAPACITY         30MB
MONTHLY RATE    500 YEN

OK

CANCEL

FIG. 5D

WELCOME TO THIS SERVICE. EXPIRATION DATE FOR USE IS JUNE 19. AFTER THE EXPIRATION DATE, UPDATE IS POSSIBLE UNTIL JUNE 29. YOU MAY READ DURING TERM FOR UPDATE. DATA SHALL BE DELETED AFTER LAPSE OF TERM FOR UPDATE.

FIG. 7

MANAGEMENT METHOD FOR SERVICE FOR STORING DATA FROM MEMORY CARD IN EXTERNAL STORAGE DEVICE AND SYSTEM FOR CARRYING OUT THE SERVICE

BACKGROUND OF THE INVENTION

1. Field of the Invention

The present invention relates to a management method for a service for storing data from a memory card in an external storage device and a system for carrying out the service.

2. Related Background Art

In recent years, a memory technology has made a remarkable advance, and a storage capacity of a memory has been increasing year after year. As a product to which the memory is applied, a memory card such as a PC card or a CF card has been spread to the general public.

The above-mentioned memory card is often used for a photographing apparatus or the like such as a digital camera or a video camera.

A capacity of such a memory card is proportional to costs for manufacturing the memory card. Therefore, for example, a user of a digital camera purchases and uses a memory card with an arbitrary data capacity taking into account a balance between the costs and the capacity. In addition, since a capacity of a memory card does not change if it is purchased once, in general, the user purchases a memory card with a little larger capacity, taking into account a maximum capacity which will be required in future.

Further, the user once transfers image data recorded in the memory card to a hard disk or the like of a computer, browses the image data on a display of the computer, and prints it.

On the other hand, according to the advance of a communication technology in recent years, there has been proposed a service in which a cellular phone or the like is connected to a digital camera to allow image data of an image photographed by the digital camera to be transferred to a data server in a remote place and stored therein. In using such a service, a user enters into an agreement with a data server provider in advance and transfers images which are photographed and stored in a memory of the camera to the data server.

However, when a memory card is purchased, a user is often undecided about how much memory capacity the user requires. Thus, there is a problem in that most users may purchase a memory with a capacity larger than is actually required. In addition, there is also a problem in that a user may purchase a memory with a small capacity and the capacity turns out to be insufficient. In this case, the user has to buy a fresh memory with a large capacity. After all, the users are forced to incur unnecessary expenditures.

SUMMARY OF THE INVENTION

An object of the present invention is to provide a system so that a registration of a right to use an external device such as a data server for storing an image may be made by using a device that is different from a device from which an image is transferred.

Another object of the present invention is to allow a virtual memory of a memory card to be arbitrarily set and changed in its capacity.

Another object of the present invention is to allow a virtual memory of a memory card to be set in its capacity in accordance with a rate.

Another object of the present invention is to enable a user to reduce the cost for purchasing the memory.

The other objects of the present invention will be apparent from the following description and drawings.

DESCRIPTION OF THE PREFERRED EMBODIMENTS

The present invention relates to a virtual memory wireless communication system which connects a memory space of a data server installed in a remote place with a communication terminal using a wireless communication unit and uses the memory space as if the same memory space as that in a memory of the data server exists in the communication terminal.

If the communication terminal is stored in a housing of a memory card type, this virtual memory system can be applied to various devices using a memory card without worrying about a communication function.

First Embodiment

Figure 1:
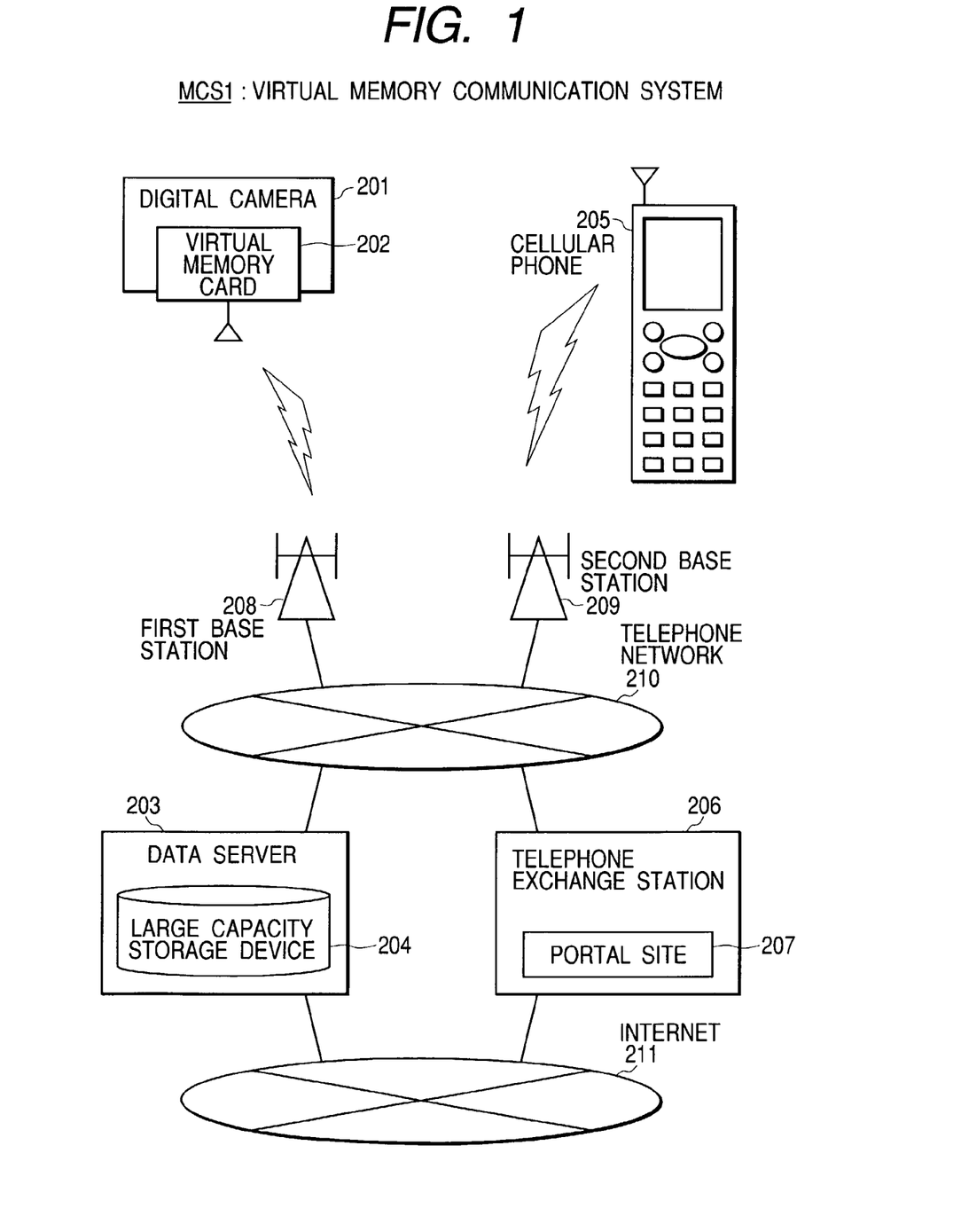
FIG. 1 is a view showing a virtual memory communication system MCS1 in accordance with a first embodiment of the present invention.

FIG. 1 is a view showing a virtual memory communication system MCS1 in accordance with a first embodiment of the present invention.

The virtual memory communication system MCS1 is used for a digital camera 201. That is, a virtual memory card 202 is attached to a CF card slot of the digital camera 201. The virtual memory card 202 is a CF (Compact Flash) card type in its appearance. The virtual memory card 202 is provided with a wireless communication function, and can be connected to a telephone network 210 via a first base station 208 and is capable of communicating with a data server 203.

The data server 203 is connected to the telephone network 210 by a not-shown communication unit and has a large capacity storage unit 204 for storing an image received from the digital camera 201.

A cellular phone 205 having a browser function can make a connection with the telephone network 210 via a second base station 209 and is capable of accessing a portal site 207 of a telephone exchange station 206.

The data server 203 and the telephone exchange station 206 are connected to the Internet 211.

A user registration page, for which an administrator of the data server 203 has entered into an agreement with a telephone company, is set in the portal site 207 in advance. A user uses the browser function of the cellular phone 205, accesses the user registration page of the portal site 207, and registers an ID, thereby registering a right to use the virtual memory card 202.

The right to use registered in the user registration page of the portal site 207 is communicated to the data server 203 via the telephone network 210 or the Internet 211. Then, an access right for each user (virtual memory card 202) for accessing the large capacity storage device 204 is approved.

When the digital camera 201 accesses the virtual memory card 202, the virtual memory card 202 communicates and makes a connection with the data server 203 via the telephone network 210. Then, an access to the large capacity storage device 204 is executed.

When an image is photographed by the digital camera 201, image data of the photographed image is wirelessly sent via the virtual memory card 202 and stored in the large capacity storage device 204. In the case in which the photographed image is browsed on the digital cameral 201, the image data stored in the large capacity storage device 204 is wirelessly sent to the virtual memory card 202 and displayed on the digital cameral 201.

The data server 203 is also connected to the Internet 211. The image data stored in the large capacity storage device 204 is converted into a home page in the HTML format, which can be browsed from a browser terminal apparatus such as a PC connected to the Internet 211.

The cellular phone 205 is provided with an Internet connection function and can make a connection with the Internet 211 via the telephone exchange station 206. Thus, the image can be browsed with the cellular phone 205.

An access right for accessing the data server 203 is registered only for a period set in advance and lapses when the period has lapsed.

Next, a function from registration to lapse of the access right for accessing the data server 203 will be described.

Figure 2:
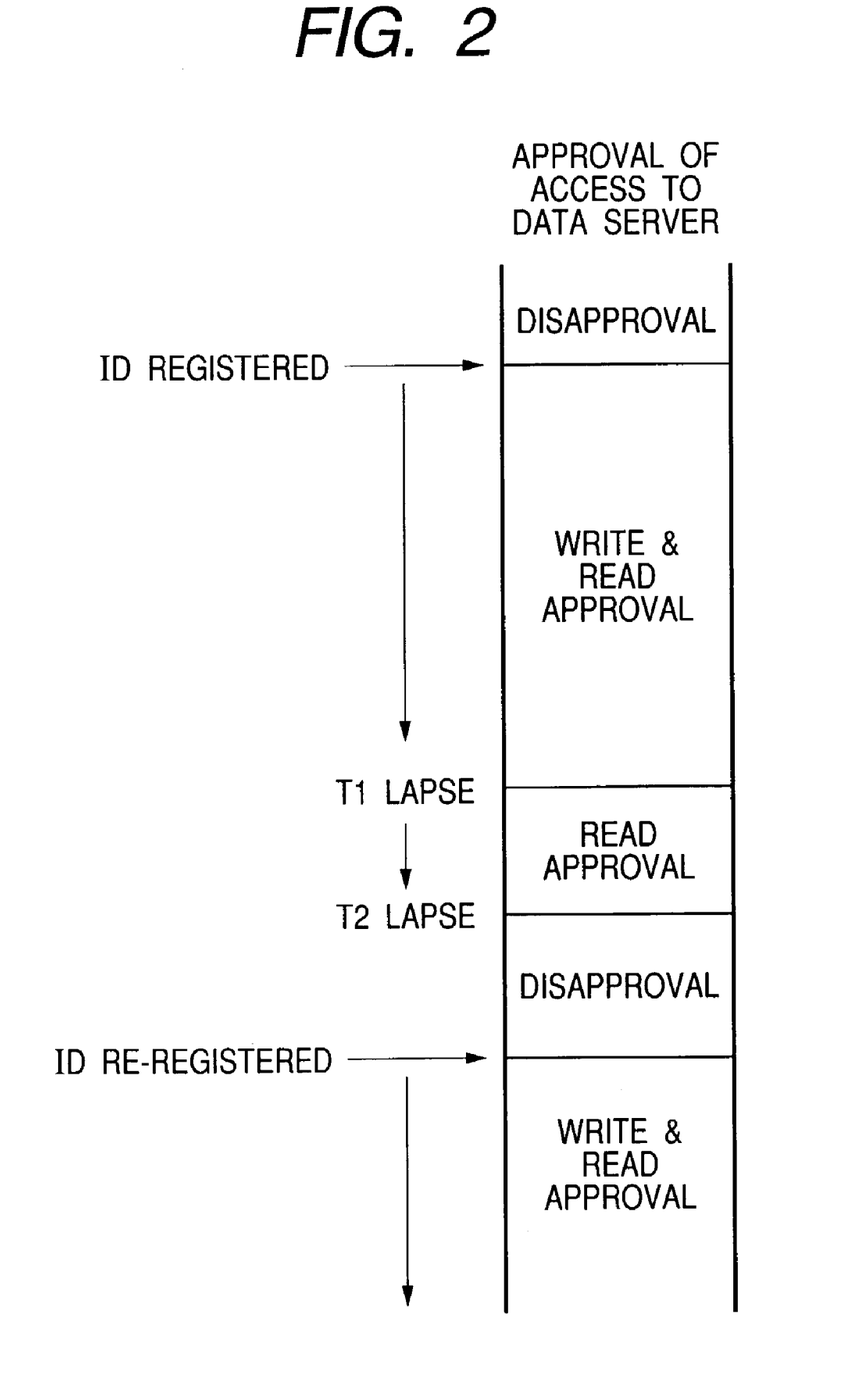
FIG. 2 is a flowchart showing a basic function from registration to lapse of a right to use concerning the virtual memory communication system MCS1 in accordance with the first embodiment of the present invention.

FIG. 2 is a flowchart showing a basic function from registration to lapse of a right to use concerning the virtual memory communication system MCS1.

When a user accesses the user registration page of the portal site 207 from the cellular phone 205 to register the ID of the virtual memory card 202, a use area is secured in the large capacity storage device 204 of the data server 203, and an access right for writing data in and reading data from the large capacity storage device 204 is approved.

With this access right, the writing of data is disapproved and only the reading of data becomes possible when a predetermined time T1 has lapsed after the ID was registered.

Then, when a predetermined time T2 has further lapsed after the time T1 lapsed, both the writing and reading of data are disapproved and the access right lapses. Data stored in the large capacity storage device 204 so far is deleted and the secured use area also disappears.

Thereafter, when the user registers the same ID again, a new use area is secured in the large capacity storage device 204 in the same manner as at the time when the user made a registration beforeThen, the writing of data and the reading of data are possible until the time T1 lapses from the re-registration as in the above description.

Note that, with browsing through the Internet 211, only the reading of data is possible. The browse through the Internet 211 is also possible until the time T2 lapses after the time T1 has lapsed.

In the case in which the user desires to store data, it is possible to read desired data from the data server 203 via the Internet 211 using a personal computer (PC) or the like and store the data in the PC.

In addition, if the user attaches the virtual memory card 202 to a PC card slot or a CF card slot of the PC or the like, it is possible to write data in and read it from the large capacity storage device 204 as in the digital camera 201. It is also possible to utilize the PC or the like before the time T2 lapses to transfer the data to a hard disk or the like in a personal PC.

Figure 3:
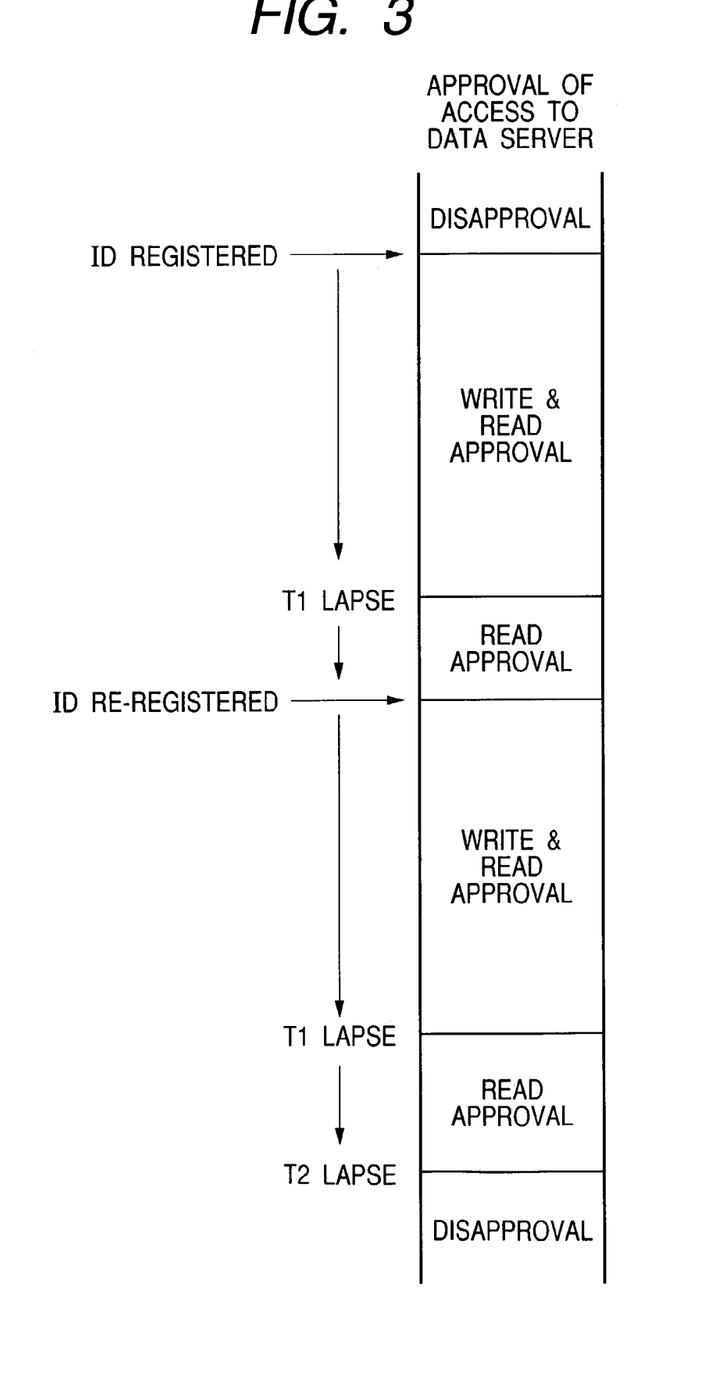
FIG. 3 is a flowchart showing a function for continuously registering the right to use the virtual memory communication system MCS1 in accordance with the first embodiment of the present invention.

Next, a function for continuously registering a right to use the virtual memory communication system MCS1 will be described.

FIG. 3 is a flowchart showing a function for continuously registering the right to use the virtual memory communication system MCS1.

First, a user accesses the portal site 207 from the cellular phone 205 to register the ID of the virtual memory card 202. Consequently, a use area is secured in the large capacity storage device 204 of the data server 203, and an access right for writing data in and reading data from the large capacity storage device 204 is approved.

With this access right, the writing of data is disapproved and only the reading of data becomes possible when a predetermined time T1 has lapsed after the ID of the virtual memory card 202 was registered.

Here, before time T2 lapses after the time T1 lapsed when the user accesses the portal site 207 from the cellular phone 205 again to re-register the ID of the virtual memory card 202, an access right for accessing the use area secured in the large capacity storage device 204 is approved, and the writing of data and the reading of data becomes possible until the time T1 lapses from the re-registration of the ID.

Then, when the time T1 has lapsed from the re-registration of the ID, the writing of data is disapproved and only the reading of data becomes possible.

Then, when the time T2 has lapsed after the time T1 lapsed, both the wiring of data and the reading of data are disapproved and the access right lapses. Data stored in the large capacity storage device 204 so far is deleted and the secured use area also disappears.

In this case, if the ID is registered for the third time before the time T2 lapses, the access right is extended by the time T1 from the third-time registration of the ID.

When the ID is re-registered before the first time T1 lapses, the access right is secured for a total time of a remaining time of the first time T1 and a new time T1.

The user can confirm a remaining time of the access right by accessing the user registration page of the portal site 207.

Figure 4:
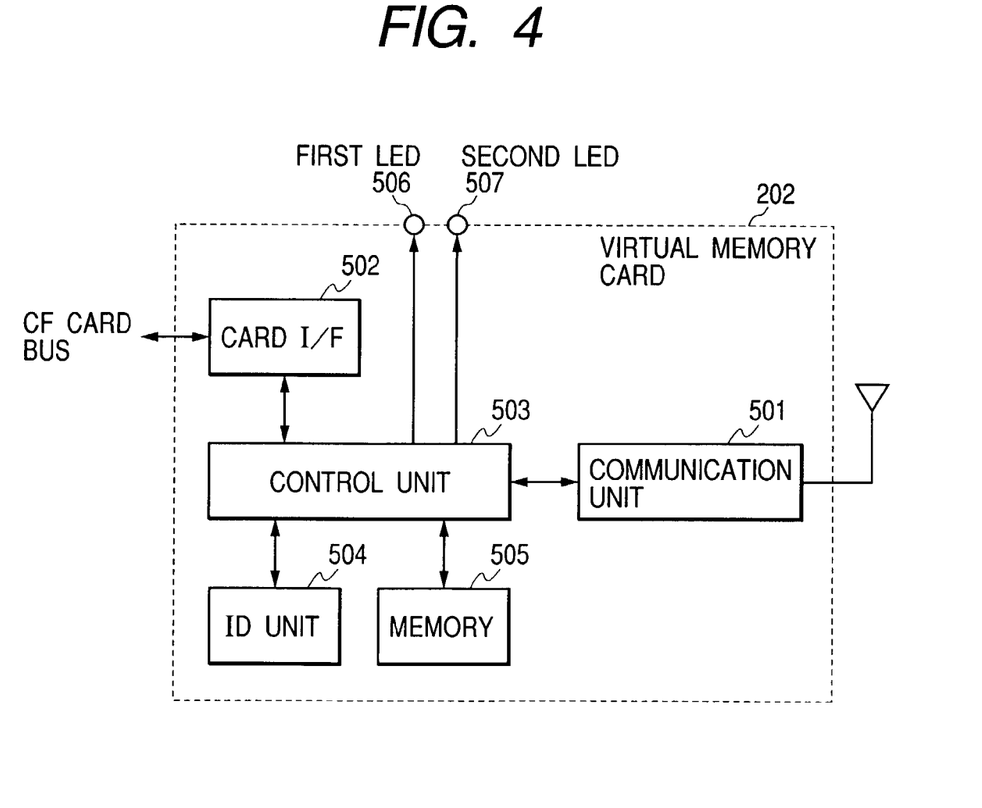
FIG. 4 is a block diagram showing an internal structure of a virtual memory card 202 in accordance with the first embodiment of the present invention.

Next, an internal structure of the virtual memory card 202 will be described.

FIG. 4 is a block diagram showing the internal structure of the virtual memory card 202.

The virtual memory card 202 includes: a communication unit 501 for performing wireless communication; a card interface 502 connected to a bus of a CF card standard; a control unit 503 for controlling the entire virtual memory card 202; an ID unit 504 having ID values different from each other recorded therein; a memory 505; a first LED 506 indicating that it is possible to write data in or read data from the virtual memory card 202; and a second LED 507 indicating that communication is possible.

The communication unit 501 connects a wireless communication path between the communication unit 501 and the first base station 208 to establish a communication path to and from the data server 203. The communication unit 501 always monitors a wireless connection state between the communication unit 501 and the first base station 208. When it is possible to make a connection with the first base station 208, the communication unit 501 lights the second LED 507 to visually indicate to the user that wireless connection is possible. Therefore, the user can easily confirm whether the wireless communication is possible or impossible according to whether the second LED 507 is lighted or not lighted. When the wireless communication is impossible, the user cannot use the virtual memory card 202.

The card interface 502 is provided with a function for connecting the control unit 503 to a CF card bus in accordance with a specification of a CF card (CF+ and Compact Flash Specification). When the card interface 502 is accessed from the CF card bus, the CF card is recognized as an ATA card.

The "ATA card" is an I/O card provided with a protocol complying with AT Attachment Interface for Disk Drive of the ANSI standard which is a standard for hard disks. It is defined in detail from a register structure to a protocol as a CF-ATA Drive in the specification of a CF card (CF+ and Compact Flash Specification).

Therefore, from the CF card bus side, the ATA card is recognized as a memory card which can be used with the same control as used for the hard disk. Data is read from and written in the ATA card according to an ATA control command.

The ATA control command written in the ATA card from the CF card bus side is received by the control unit 503 once and sent to the data server 203 via the communication unit 501 and the first base station 208. In the data server 203, the ATA control command is processed as an access command for accessing the large capacity storage device 204.

Then, data requested to be written in the ATA card from the CF card bus side is transferred to the data server 203 and written in the large capacity storage device 204. Data requested to be read from the ATA card from the CF card bus side is read from the large capacity storage device 204 and transferred to the CF card bus side.

The ID unit 504 has been assigned an individual number (ID value) which is different for each virtual memory card. When the control unit 503 uses the ID value as access authentication when it accesses the data server 203.

This ID value is printed on an external surface of the virtual memory card 202, and the user registers an ID from the cellular phone 205 in accordance with the ID value.

The memory 505 is a nonvolatile memory and stores a parameter corresponding to a state after access every time the large capacity storage device 204 is accessed.

It is possible to store a used capacity, an unused capacity, an index of a used file, and dates and times of the time T1 and the time T2, which are expiration dates for use, of the large capacity storage device 204 in the memory 505, and communicate information such as a file list to the CF card bus side without using the communication path.

As described above, by storing parameters in the memory 505, a cache function for quickly responding to an access from the CF card bus is realized.

The first LED 506 is an LED for indicating whether or not the virtual memory card 202 is usable. The first LED 506 lights off when an ID is not registered. The first LED 506 illuminates blue when the ID is registered and the time T1 has not lapsed, illuminates red before the time T2 lapses after the ID was registered and time T1 has lapsed, and lights off after the time T2 has lapsed.

Therefore, while the first LED 506 illuminates blue, the user can recognize that it is possible to write data in and read data from the data server 203. While the first LED 506 illuminates red, the user can recognize that it is possible only to read data from the data server 203 and the right to use will lapse soon. In addition, when the first LED 506 lights off, the user can recognize that the ID is not registered.

Next, an operation method of the cellular phone 205 at the time when a user uses the cellular phone 205 to register an ID will be described.

FIGS. 5A to 5D illustrate the operation method of the cellular phone 205 at the time when the user uses the cellular phone 205 to register an ID. The figures show display screens at the time when the cellular phone 205 is connected to the user registration page of the portal site 207 in which a right to use the data server 203 is registered.

In this embodiment, it is assumed that the time T1 is one month, the time T2 is ten days, a used capacity is 30 MB, and a monthly rate is 500 yen.

Figure 5A:
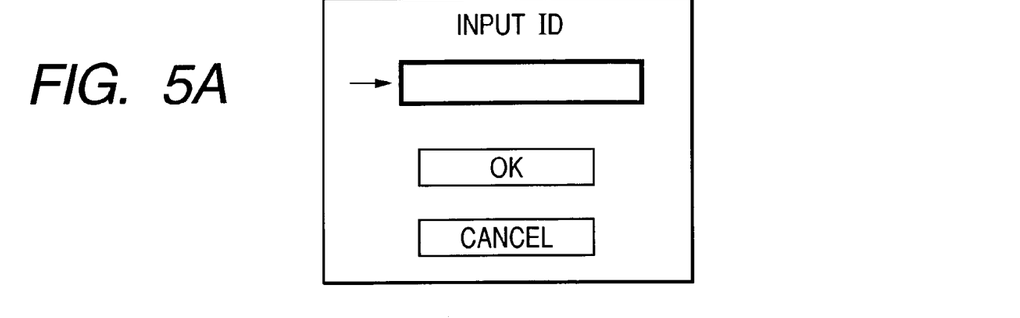
FIGS. 5A, 5B, 5C and 5D illustrate an operation method of a cellular phone 205 when a user uses the cellular pone 205 to register an ID in accordance with the first embodiment.

When the cellular phone 205 is connected to the user registration page, as shown in FIG. 5A, a screen on which an ID value is inputted is displayed. Here, the user inputs an ID value printed on the external surface of the virtual memory card 202.

Figure 5B:
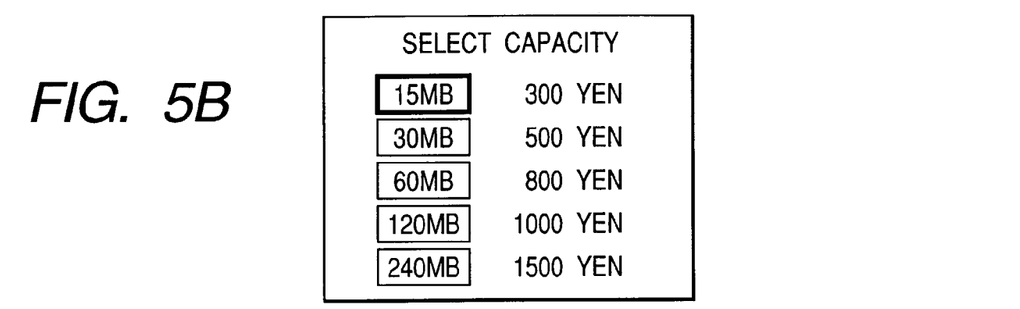

In the user registration page of the portal site 207, if the inputted ID value is an effective value, subsequently, as shown in FIG. 5B, a screen is displayed on which a desired used capacity in the large capacity storage device 204 is selected.

On the screen shown in FIG. 5B, rates corresponding to capacities to be selected are also displayed.

Figure 5C:
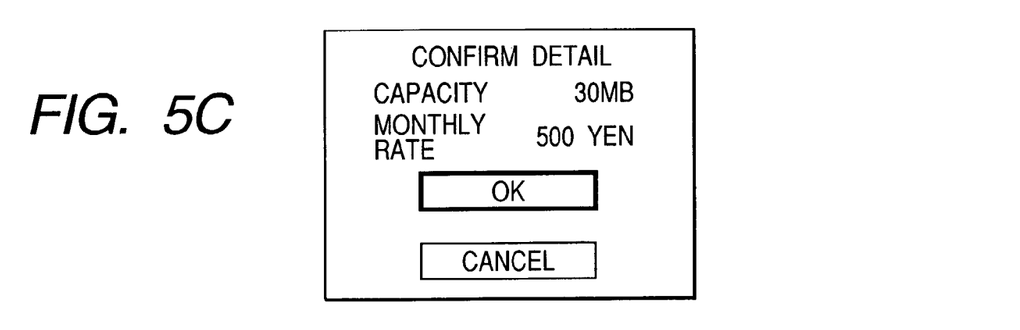

When the user selects a desired capacity, a final confirmation screen as shown in FIG. 5C is displayed.

Figure 5D:
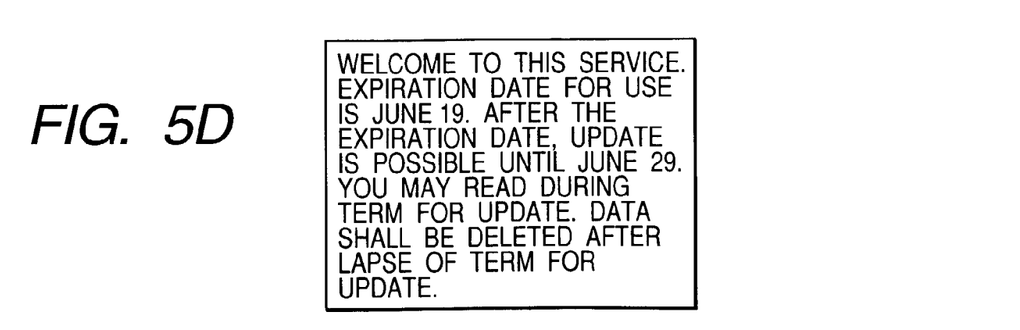

When the user selects OK on the final confirmation screen shown in FIG. 5C, a message as shown in FIG. 5D is displayed, and the user can confirm an expiration date for use.

The telephone company managing the portal site 207 collects the rate registered as described above together with telephone charges of the cellular phone 205 and pays the rate to a company operating the data server 203.

Figure 6:
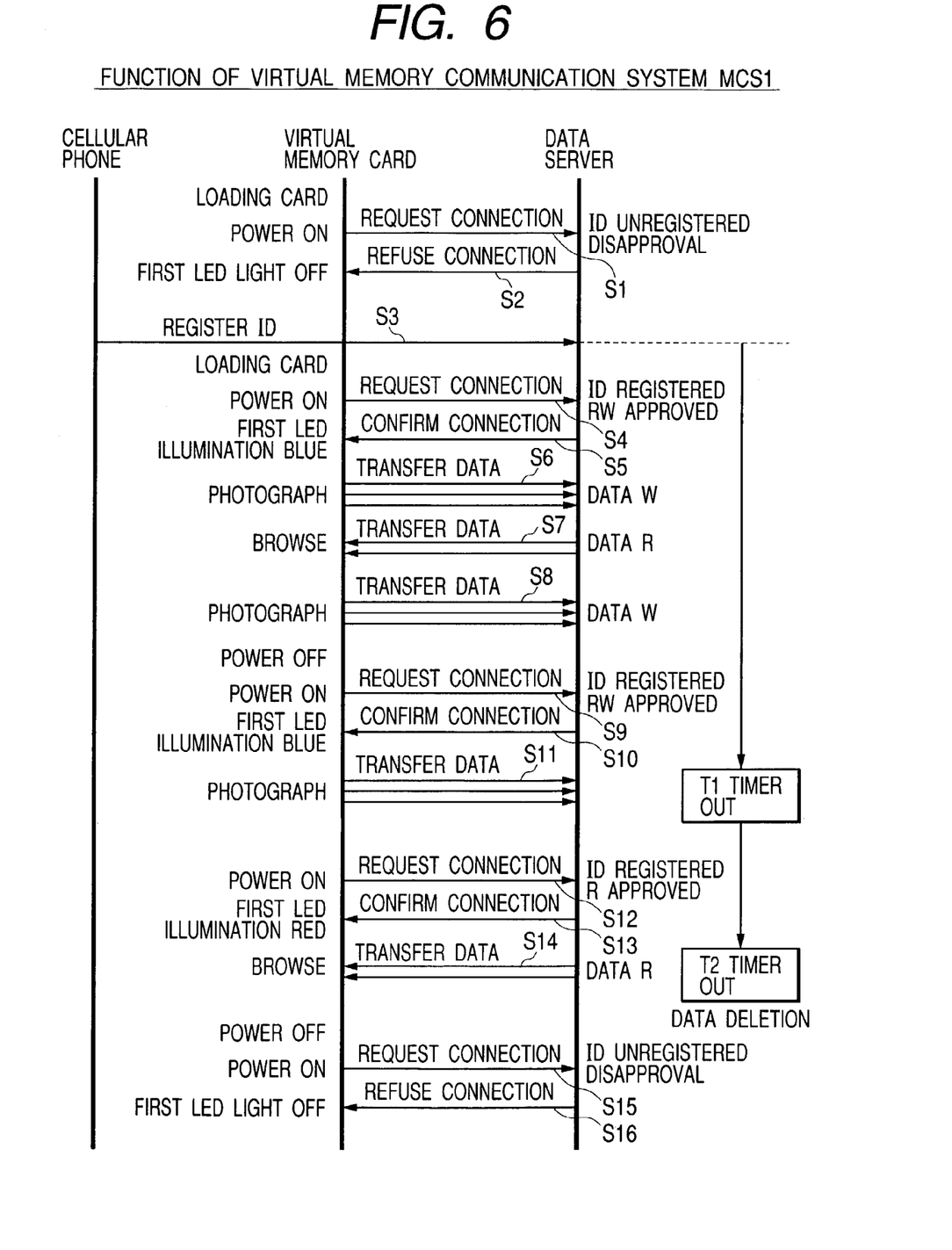
FIG. 6 is a flowchart showing in detail a sequence of registering an ID of the virtual memory card 202, writing data in and reading data from a data server 203 in accordance with the first embodiment.

Next, a function for registering the ID of the virtual memory card 202 and writing data in and reading data from the data server 203 will be described.

FIG. 6 is a flowchart showing in detail a sequence of registering the ID of the virtual memory card 202, and writing data in and reading data from the data server 203.

First, when the virtual memory card 202 is loaded in the digital camera 201 and a power supply is turned on in a state in which the ID is not registered, the virtual memory card 202 establishes a wireless communication path between the virtual memory card 202 and the data server 203 and requests connection in accordance with an ID value (S1).

The data server 203 checks whether or not the ID value of the connection request (S1) is registered. Since the ID value is unregistered at this point, the data server 203 returns connection refusal (S2) to the virtual memory card 202.

The virtual memory card 202 having received the connection refusal (S2) leaves the first LED, which indicates a state of an access right, lighted off.

At this point, since the virtual memory card 202 does not respond to the access from the digital camera 201, the digital camera 201 judges that the virtual memory card 202 is not loaded.

Next, the user accesses the portal site 207 from the cellular phone 205 and registers an ID in order to secure an access right as described above (S3) in the user registration page. Then, information on the registration of the ID is communicated to the data server 203, an access to the data server 203 with the registered ID becomes possible, and monitoring of a T1 timer for counting the time T1 is started.

Then, when the power supply of the digital camera 201 loaded with the virtual memory card 202 is turned ON again, the virtual memory card 202 establishes a wireless communication path between the virtual memory card 202 and the digital server 203 and requests connection in accordance with the ID value (S4).

The data server 203 confirms that the ID value is registered. Since the T1 timer shows a time within the time T1, the data server 203, with a connection confirmation message, notifies the virtual memory card 201 that it is possible to write data in and read data from the large capacity storage device 204 (S5).

In response to the connection confirmation message indicating that it is possible to write data in and read data from the large capacity storage device 204 (S5), the first LED 506 of the virtual memory card 202 illuminates blue.

When the user photographs an image with the digital camera 201 in response to the blue illumination of the first LED 506, image data is written in the virtual memory card 202 from the digital camera 201 using the ATA control command.

The virtual memory card 202 wirelessly sends the written image data to the data server 203 via the communication unit 501 and transfers the data to the large capacity storage device 204 (S6).

In addition, when the user designates an image file in an attempt to browse the image which has been transferred to the virtual memory card 202 with the digital camera 201, image data of the image is received by the virtual memory card 202 from the large capacity storage device 204 of the data server 203 via the wireless communication path and is transferred to the digital camera 201 (S7).

Moreover, when the user photographs an image with the digital camera 201 again, image data is written in the virtual memory card 202 from the digital camera 201 using the ATA control command and is transferred to the data server 203 via the communication unit 501 (S8).

The writing of the image data is performed until the monitoring of the T1 timer, which started at the time of ID registration, reaches timer out. It is possible to write data in and read data from the large capacity storage device 204 until an amount of data reaches a maximum permissible amount of data secured in the large capacity storage device 204.

When the user cuts the power supply of the digital camera 201 once and turns it ON again, every time the power supply is turned OFF and ON, the virtual memory card 202 sends a connection request (S9) to the data server 203 in order to confirm ID registration and to confirm access restrictions according to the T1 timer and the T2 timer, receives a connection confirmation message from the data server 203, and lights or lights off the first LED 506 according to a result of the connection confirmation.

Then, if it is possible to write data in the large capacity storage device 204, as in the above description, the virtual memory card 202 lights the first LED 506 blue. When the user photographs an image with the digital camera 201, the virtual memory card 202 transfers image data to the data server 203 through the wireless communication path (S11).

When the time T1 has lapsed from the ID registration of the user and the T1 timer has reached timer out, in the case in which the user turns on the power supply of the digital camera 201 and sends a connection request to the data server 203 from the virtual memory card 202 (S12), a connection confirmation message, which indicates that the ID has been registered and an access only for reading data from the large capacity storage device 204 is possible, is sent from the data server 203 (S13).

In response to this connection confirmation message (S13), the first LED 506 of the virtual memory card 202 illuminates red which indicates that only the reading of data from the large capacity storage device 204 is possible.

In response to the first LED 506 illuminating red, the user learns that it is possible to only browse the image data written in the virtual memory card 202.

Here, as in the above description, when the user designates an image file in an attempt to browse the image which has been transferred to the virtual memory card 202 with the digital camera 201, image data of the image is received by the virtual memory card 202 from the large capacity storage device 204 of the data server 203 via the wireless communication path and is transferred to the digital camera 201 (S14).

When the time T2 has lapsed from the ID registration of the user and the T2 timer has reached timer out, the access right of the data server 203 is deleted, and image data of the ID stored in the large capacity storage device 204 is deleted.

Then, when the user turns on the power supply of the digital camera 201 and sends a connection request to the data server 203 from the virtual memory card 202 (S15), a connection refusal message, which indicates that the ID is not registered and an access is impossible, is sent from the data server 203 (S16).

In response to this connection refusal message (S16), the first LED 506 of the virtual memory card 202 comes into a state of light off which indicates that the ID is not registered.

In addition, although not shown in the sequence of FIG. 6, when the wireless communication path from the virtual memory card 202 to the data server 203 cannot be established in a state before the T1 timer out, since the digital camera 201 recognizes that the virtual memory card 202 is not loaded, the user cannot photograph an image. Since it can be checked whether or not the wireless communication path can be established according to an illumination state of the second LED, the user can easily judge whether or not photographing is possible.

Another Embodiment

In the first embodiment, a time of the T1 timer out and a time of the T2 timer out are measured as a lapsed time from setting an access right regardless of whether or not an access is performed. Instead of this, it is also possible to accumulate a time during which the virtual memory card 202 is connected to the data server 203 and measure the time of the T1 timer out and the time of the T2 timer out as a lapsed time of the accumulation.

In addition, in the first embodiment, an expiration date for use of the virtual memory communication system MCS1 is defined by the time T1 and the time T2. However, in stead of setting an expiration date for use in terms of time in this way, it is also possible to set the expiration date for use of the virtual memory communication system MSC1 according to an amount of packets read and written.

In this way, even in the case in which an expiration date for use is set in terms of packets, a system structure is the same as that of the virtual memory communication system MSC1 shown in FIG. 1, and a structure of the virtual memory card 202 is the same as the structure shown in FIG. 4.

Figure 7:
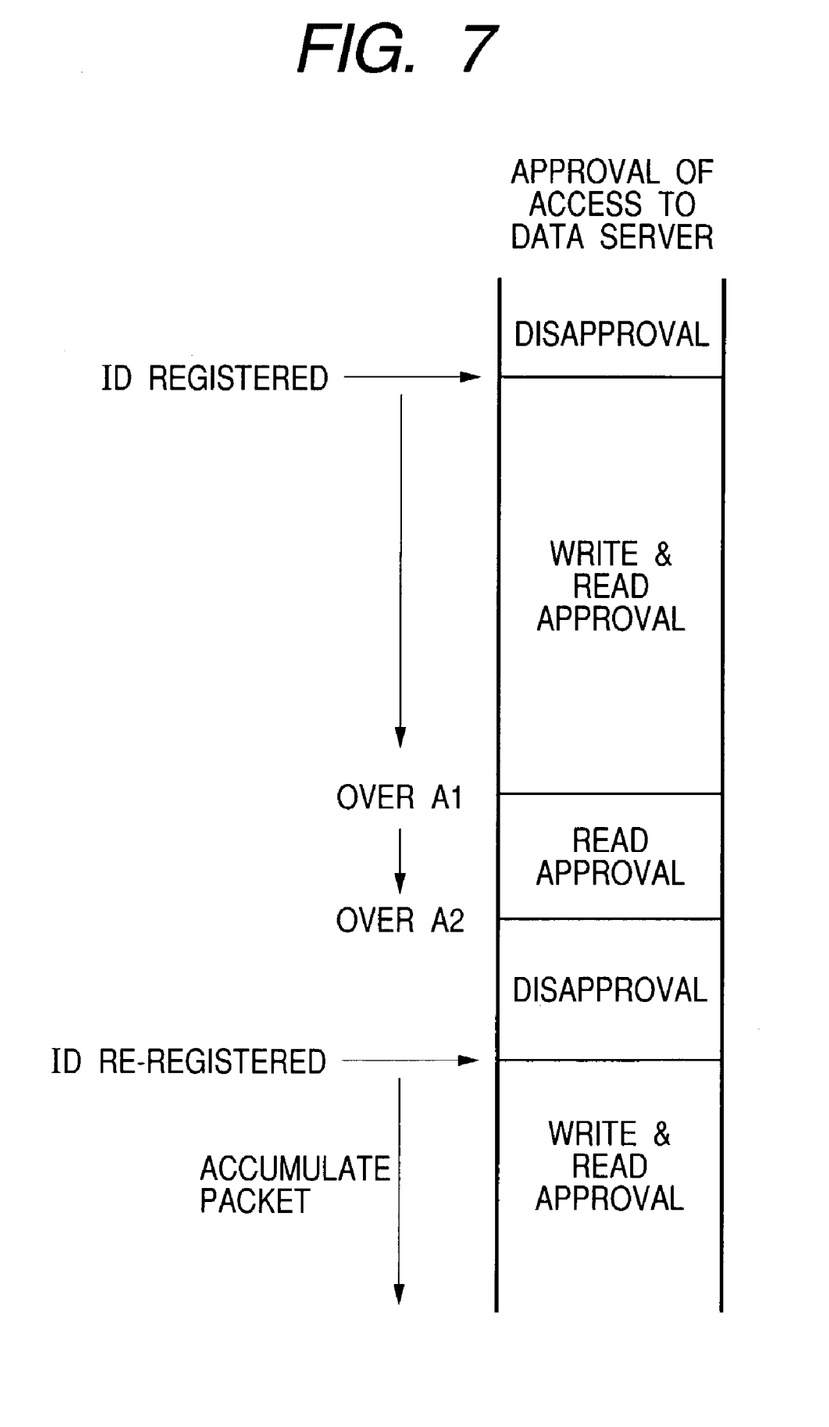
FIG. 7 is a flow chart showing a function for setting an expiration date for use of the virtual memory communication system MSC1 according to a read and written packet amount in accordance with another embodiment of the present invention.

FIG. 7 is a flowchart showing a function for setting an expiration date for use of the virtual memory communication system MSC1 according to an amount of packets read and written.

When the user accesses the user registration page of the portal site 207 from the cellular phone 205 and registers an ID of the virtual memory card 202, a use area is secured in the large capacity storage device 204 of the data server 203, and an access right for writing data in and reading data from the large capacity storage device 204 is approved.

After the ID registration for the access right, the data server 203 accumulates data packets sent and received according to accesses from the virtual memory card 202 and, when an accumulated packet amount is over A1, the writing of data is disapproved and only the reading of data is possible.

Then, the accumulated packet amount is over A2, both the writing of data and the reading of data are disapproved, the access right lapses, data stored in the large capacity storage device 204 so far is deleted, and the secured use area also disappears.

Thereafter, when the same ID is registered again, a new use area is secured in the large capacity storage device 204 in the same manner as at the time when the user made a registration before. Then, the writing of data and the reading of data become possible until the accumulated packet amount reaches A1 as in the above description.

Note that, with browsing through the Internet 211, only the reading of data is made possible. The browsing through the Internet 211 is possible until the packet amount is over A2.

When the user desires storage of data, the user is capable of reading the data through the Internet 211 using a PC or the like and storing it in the PC.

Note that the above-mentioned embodiments can be grasped as an invention of a method. That is, the above-mentioned embodiments are examples of a virtual memory wireless communication method which includes the step of: providing a memory interface and a wireless communication unit in a memory card; connecting the memory card and a data storage device provided in a remote place with a wireless line; registering identification information of the memory card in the data storage device; writing data from the memory card in the data storage device while the identification information of the memory card is registered in the data storage device; reading data written in the data storage device and transferring the read data to the memory card while the identification information of the memory card is registered in the data storage device; and setting, from another device such as a cellular phone, a capacity for allowing the data from the memory card to be written in the data storage device.

According to the present invention, there is an effect that, if a user purchases a virtual memory card, the user can arbitrarily set and change a capacity of a virtual memory and can eliminate unnecessary expenditures.

In addition, since management of an access right for accessing a large capacity storage device, and the writing and reading of data in and from the large capacity storage device is performed according to individual information of a memory card, the card can be used even if it is inserted in another device, and unnecessary expenditures for the user can be reduced. For example, in the case in which the access right and the writing and reading of data are managed according to individual information of an apparatus such as a digital camera or a computer, the user has to enter into an agreement for a right to use a storage device for each apparatus. However, if a right to use a large capacity storage device is managed according to individual information of a memory card as in the present invention, the user only has to enter into an agreement for the right to use the large capacity storage device according to the individual information of the memory card.

What is claimed is:

1. A data storage system comprising:
    a virtual memory card inserted into a camera which has a memory interface and wireless communication means;
    a storage device which stores data sent by the wireless communication means of the virtual memory card, the storage device being connected to the virtual memory card via a communication network; and
    an information processing device that has a human user interface adapted to input registration information for a right to use the storage device by a user of the virtual memory card, and that is connected to the storage device via a wireless network and separated from the virtual memory card and the camera,
    wherein, the data storage system is configured in such a way that the user can transfer data from the virtual memory card to the storage device via the communication network when the information processing device registers identification information of said virtual memory card via the wireless network.

2. A data storage system according to claim 1, wherein the registration of the right to use performed by the information processing device also includes setting of a memory capacity for allowing data to be stored in the storage device.

3. A data storage system according to claim 1, wherein, in the registration of the right to use performed by the information processing device, the memory capacity for allowing data to be stored in the storage device is determined according to a rate for using the storage device.

4. A data storage system according to claim 1, wherein the information processing device is a portable terminal.

5. A data storage system according to claim 1, wherein the information processing device accesses a portal site for performing user registration in the storage device and performs registration of the identification information.

6. A data storage system according to claim 1, wherein the virtual memory card is configured to send a photographed image which is subjected to writing processing by a digital camera via the memory interface with the communication means.

7. A data storage system according to claim 1, wherein the right to use the storage device is managed according to a first parameter for managing storage of data in and reading of data from the storage device and a second parameter for managing the reading of data from the storage device.

8. A data storage system according to claim 1, wherein the right to use the storage device is managed such that the storage of data in the storage device and the reading of data from the storage device are possible utilizing the communication means of the virtual memory card until a first time lapses after the right to use is registered from the information processing device, the reading of data from the storage device is possible utilizing the communication means of the virtual memory card and the storage of data in the storage device is impossible until a second time lapses after the first time has lapsed, and the storage of data in and the reading of data from the storage device are impossible after the lapse of the second time.

9. A method of managing a service for storing data from a virtual memory card, which has a memory interface and wireless communication means, in an external storage device, the method comprising:
    inputting identification information of the virtual memory card through the human user interface of an information processing device via a wireless network and registering a right to use the storage device, and allowing the virtual memory card, for which the identification information is registered, to store data in the storage device following insertion of the memory card into a camera, wherein the information processing device is connected to the storage device via the wireless network and separated from the virtual memory card and the camera.

10. A method according to claim 9, wherein the registration of the right to use performed by the information processing device also includes setting of a memory capacity for allowing data to be stored in the storage device.

11. A method according to claim 9, wherein, in the registration of the right to use performed by the information processing device, the memory capacity for allowing data to be stored in the storage device is determined according to a rate for using the storage device.

12. A method according to claim 9, wherein the information processing device is a portable terminal.

13. A method according to claim 9, wherein the information processing device accesses a portal site for performing user registration in the storage device and performs registration of the identification information.

14. A method according to claim 9, wherein the virtual memory card sends a photographed image which is subjected to writing processing by a digital camera via the memory interface with the communication means.

15. A method according to claim 9, wherein the right to use the storage device is managed according to a first parameter for managing storage of data in and reading of data from the storage device and a second parameter for managing the reading of data from the storage device.

16. A method according to claim 9, wherein the right to use the storage device is managed such that the storage of data in the storage device and the reading of data from the storage device are possible utilizing the communication means of the virtual memory card until a first time lapses after the right to use is registered from the information processing device, the reading of data from the storage device is possible utilizing the communication means of the virtual memory card and the storage of data in the storage device is impossible until a second time lapses after the first time has lapsed, and the storage of data in and the reading of data from the storage device are impossible after the lapse of the second time.

* * * * *